May 29, 1951     F. J. MUEHLSTEIN     2,555,240
DUCK CALL
Filed June 9, 1948
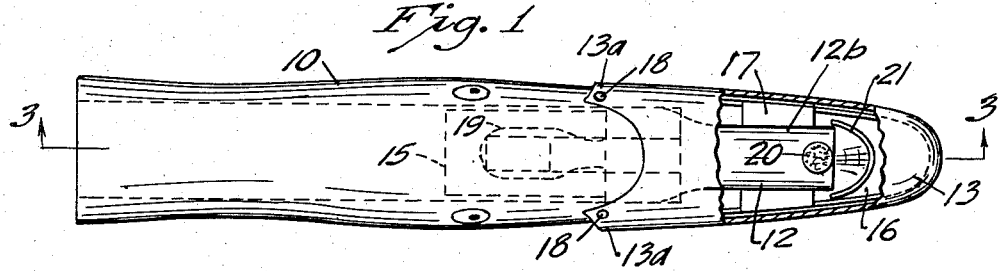
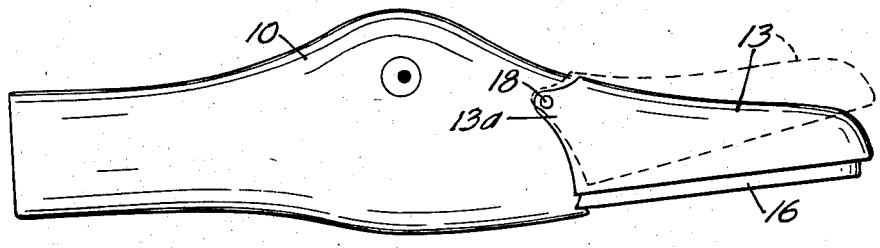
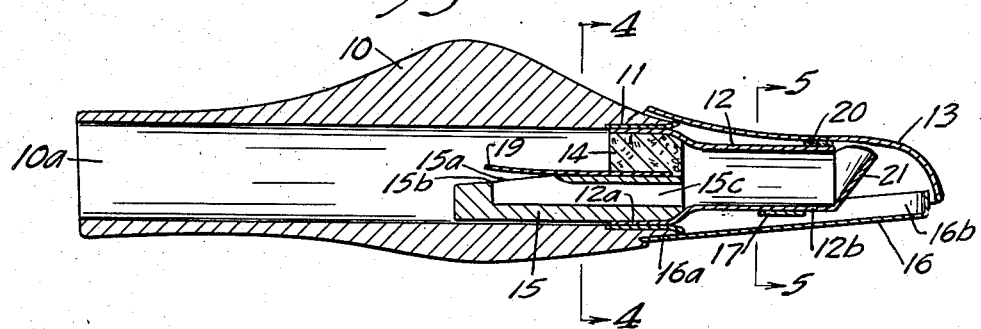
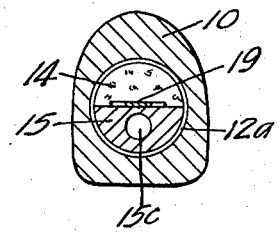 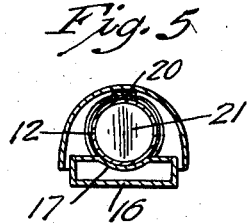 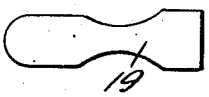
Inventor
Francis J. Muehlstein
By Williamson & Williamson
Attorneys Patented May 29, 1951

2,555,240

UNITED STATES PATENT OFFICE 2,555,240

DUCK CALL

Francis J. Muehlstein, St. Paul, Minn.

Application June 9, 1948, Serial No. 31,930

2 Claims. (Cl. 46—180)

This invention relates to duck calls and constitutes a valuable improvement over my United States Letters Patent No. 1,855,527.

Most duck calls now extensively sold require expert skill and experience on the part of the user, for production of successful results. A deceptive similarity to the call of a wild duck is usually only produced when the fingers or hand of the user over the discharge of the conventional call, are skillfully manipulated. Only a small percentage, constituting skilled manipulators of conventional duck calls, are able to call a flock of wild ducks down to their decoys.

The structure disclosed in my Patent No. 1,855,527 proved generally satisfactory and of high utility, as contrasted with its prior art devices. The original device was constructed to in many respects, closely reproduce the action of a duck's mouth and bill and vocal organs in the production and control of sounds emitted.

I have unexpectedly discovered, after exhaustive experimentation and research, that the functions of my original duck call could be quite substantially improved by correlating discharge of sound and air from the diminished portion of a tubular discharge member in relation to the end of the tube and to the upper swingable duck's bill section to obtain very sensitive fluctuations in sound, particularly trills, closely resembling those of a wild duck.

It is therefore, another object of my present invention to provide an improved duck call utilizing the general principle of my original device with a swingable upper bill member associated with the sound and wind discharge to produce opening and closing in much the manner of a wild duck, but further providing sound and wind deflecting means related to the open end of the tubular discharge and with the swingable bill section in a manner to enable the user to produce very accurately, trills and variable pitches in the call produced.

These and other objects and advantages of my invention will more fully appear from the following description made in connection with the accompanying drawings wherein like reference characters refer to similar parts throughout the several views and in which:

Fig. 1 is a top plan view of my improved duck call with some portions of the upper bill section broken away;

Fig. 2 is a side elevation showing the bill closed, in full lines and open, partially, to pressure of wind discharged, in dotted lines;

Fig. 3 is a longitudinal section taken on the line 3—3 of Fig. 1;

Fig. 4 is a cross section taken on the line 4—4 of Fig. 3 showing the relation of the air tube with the reed and its clamping attachment elements;

Fig. 5 is a cross section taken on the line 5—5 of Fig. 3; and

Fig. 6 is a plan view of the reed element detached.

In the drawings, a casing 10 having a cylindrical interior, is shaped as shown, exteriorly to resemble the head of a wild duck. Casing 10 is open at its ends and may be molded or otherwise formed from metal or plastic material or carved from such material as wood.

The rear end 10a of the casing forms a mouthpiece and preferably, is rounded to comfortably fit the mouth. At the other end, a reinforcing sleeve 11 is telescoped within the casing extending from the forward extremity thereof, for a short distance inwardly and is secured thereto to form a socket for a discharge tube 12.

Discharge tube 12, as shown, comprises a tubular, relatively short rear portion 12a adapted to snugly and frictionally fit the annular seat 11 and to be supported therefrom and has a forwardly extending diminished and longer portion 12b which extends some distance forwardly of the head casing in position to underlie the upper bill section 13 of the structure.

The rear portion 12a of the discharge tube 12, as in my original device, is adapted to receive a pair of reed mounting blocks 14 and 15 respectively. The upper block 14 is semi-cylindrical and closely fits the upper half of member 12a extending approximately to the rear edge of such member. The lower block 15 is semicircular in cross section and has a rectangular sound-receiving aperture 15a in the rear intermediate portion thereof, extending from an inclined, flatted upper surface 15b downwardly into communication with a longitudinal passage 15c which extends through the forward end of block 15 in communication with the diminished forward portion of tube member 12.

As in my original structure, a lower bill section or shell 16 constructed of sheet material, plastic or other suitable material, is secured to the forward end and lower portion of the head casing 10 by suitable interfitting means such as the tongue 16a and is also preferably secured at its intermediate portion to the underside of the tube section 12b as by a strip of metal or other material 17. Bill section 16 is stationary.

The upper swingable bill section is of shell construction resembling the upper bill section of a duck and is provided as in my original device ears 13a of triangular shape adapted to be pivoted to the upper and forward portion of the head by means of small nails or screws 18. In shaping these corners, the metal or other material of bill section 13 is slightly upturned at said corners, to enable very free swinging of the upper bill section to be obtained.

The lower edge or skirt of bill section 13 is of similar configuration but of slightly greater proportions than the upstanding flange 16b of lower bill section 16 and overlaps slightly the edges of the lower section when the call is at rest.

A reed member 19 constructed of a very thin strip of material such as metal, has its free end positioned for vibration over the sound recess 15a and as shown, is supported and clamped in operative position between the opposing surfaces of blocks 14 and 15. A small cushioning disc 20 is secured by bonding or other attachment means adjacent the outer end of tube section 12b and at the top thereof, to cushion the dropping of the hinged bill section 13 and to eliminate noise in the inward swinging of the bill section.

To the forward extremity of the discharge tube 12 I attach a peculiarly shaped trill-producing member 21 acting as a baffle and air and sound distributor in cooperative relation with the circular extremity of tube section 12b and with the chamber formed between the two bill sections.

The peculiar shape of this deflector and distributor member can be ascertained from study of Figs. 1, 3 and 5. It is of inclined trough construction, being of substantially arcuate cross section and being inclined at its bottom from the extremity of tube section 12b to its front and top in spout formation. The side edges of trough member 21 it will be noted, are spaced slightly outward of the circular forward edge of tube 12 leaving as clearly shown in Figs. 1 and 5, small arcuate slits between the rear edges of the trough member 21 and the cylindrical wall at the outer end of tube 12. With my improved construction air and sound are distributed materially upwardly against the swingable bill section, but small amounts of air and distribution of sound take place rearwardly and laterally between the rear edges of the spout member 21 and the forward extremity of tube 12. This structure produces an unexpected perfection in control of the lower "croaking" sounds and in producing tremolo sounds or trills very closely simulating those of a wild duck.

In use, the head member 10 is conveniently held with one hand, with the mouthpiece 10a comfortably fitting within the lips of the user. Air is blown through the passage within the head and the tongue is used to control sound and assist in production of variations and tremolos.

The air passes over the reed 19 causing vibration and production of sound and thereafter, the air and the sound produced pass through the passage 15c and the tube 12 and out the open end of the tube. The spout-shaped distributor member 21 directs the major portion of the air stream upwardly against the swingable bill section 13 raising this bill section proportionately with the amount of air discharged. My improved distributor more efficiently projects the discharged air against the bill to cause swinging and reciprocating of the bill to more accurately resemble the opening and closing of a duck's bill during calling.

Furthermore, it will be noted that because of the spout shape of distributor member 21, a greater intensity of discharged air against the upper shell section or bill 13 is produced. The deflection of sound vibrations upwardly and rearwardly and the resultant effect produced through the cooperation of my improved spout-like distributor 21 and the two bill sections result in emanation of sound very similar to that emanating from a live duck. Some small amount of air escapes through the slits which are formed between the rear edges of the spout member and the periphery of the outer extremity of the tube portion 12b. This distribution of air unexpectedly enables an unskilled user to very sensitively control pitches and variations in sounds produced. My improved call has a much greater range than the structure of my prior patent. Trills and tremolos can be produced with my improved call, very accurately resembling those of a wild duck.

It will of course, be understood that various changes may be made in the form, details, arrangement and proportions of the parts without departing from the scope of my invention.

What I claim is:

1. A duck call comprising a casing having a longitudinal passage therethrough, an air actuated sound-producing means located within the passage of said casing, a mouthpiece at one end of said casing, a tubular member receiving air and sound waves from said casing and terminating forwardly of said casing, a shell swingably attached to the forward portion of said casing and overlying the outer extremity of said tubular member and a spout shaped air distribution member in the form of a deflector plate having its lower edge positioned against the lower forward edge of said tubular member and having a front portion diverging upwardly from the forward end of said tubular member and having curved side portions extending from the front portion rearwardly to the sides of the extremity of said tubular member and spaced slightly therefrom to deflect air rearwardly.

2. A duck call comprising a casing having a longitudinal passage therethrough, an air actuated sound-producing means located within the passage of said casing, a mouthpiece at one end of said casing, a tubular member receiving air and sound waves from said casing, and terminating forwardly of said casing, a shell swingably attached to the forward portion of said casing and overlying the outer extremity of said tubular member and a spout-shaped air distribution member secured to the discharge end of said tubular member and extending upwardly and forwardly therefrom to direct air and sound waves produced upwardly against said swingable shell and also provide for distribution of sound waves below said shell member, said spout shaped member being affixed to the forward or discharge extremity of said tubular member and having side portions for deflecting air rearwardly, said side portions being spaced slightly from the forward extremity of said tubular member and being disposed outwardly thereof.

FRANCIS J. MUEHLSTEIN.

REFERENCES CITED

The following references are of record in the file of this patent:

UNITED STATES PATENTS

| Number | Name | Date |
| --- | --- | --- |
| 1,855,527 | Muehlstein | Apr. 26, 1932 |